United States Patent [19]
Knight

[11] 3,889,055
[45] June 10, 1975

[54] OPTICAL METHOD AND APPARATUS FOR THE AREA MEASUREMENT OF OPAQUE OBJECTS

[75] Inventor: Robert F. Knight, Sunnyvale, Calif.

[73] Assignee: International Imaging Systems, Mountain View, Calif.

[22] Filed: May 13, 1974

[21] Appl. No.: 469,076

[52] U.S. Cl. ... 178/6.8; 178/DIG. 36; 178/DIG. 37; 356/158
[51] Int. Cl. ............................................. H04n 7/18
[58] Field of Search. 178/DIG. 1, DIG. 36, DIG. 37, 178/6.8; 235/92 DN, 92 MT; 356/158

[56] References Cited
UNITED STATES PATENTS

| | | | |
|---|---|---|---|
| 3,049,588 | 8/1962 | Barnett | 178/DIG. 1 |
| 3,679,820 | 7/1972 | Montone | 178/DIG. 36 |

OTHER PUBLICATIONS
A Scanning Method for the Determination of Printed Wiring Area, R.W.A. Gill, Trans. Inst. Metal Finishing, Vol. 48, No. 2, Aug. 1969

*Primary Examiner*—Howard W. Britton
*Assistant Examiner*—Michael A. Masinick
*Attorney, Agent, or Firm*—Lowhurst, Aine & Nolan

[57] ABSTRACT

A television camera scans the surface of an opaque object whose surface area is to be measured and also scans an opaque reference standard with a known surface area, video outputs being obtained from the two objects with time lengths proportional to the area scanned. The video signal obtained from the measured object is used to gate pulses from a pulse source with a known pulse rate to a first pulse counter, the pulse count being proportional to the area of the measured object. The video signal obtained from the reference standard is used to gate pulses from said pulse source to a second pulse counter, the pulse count being proportional to the known area of the reference object. A predetermined pulse count is established in a register circuit which accurately reflects the actual known area of the reference object. The pulse count in the second counter is compared with the predetermined pulse count and any difference therebetween is used to create an error signal. The error signal is used to correct the pulse rate from said pulse source to bring the count in the second counter into agreement with the predetermined registered count, thus making the pulse count in the first counter more nearly reflect the actual surface area of the measured area.

4 Claims, 1 Drawing Figure

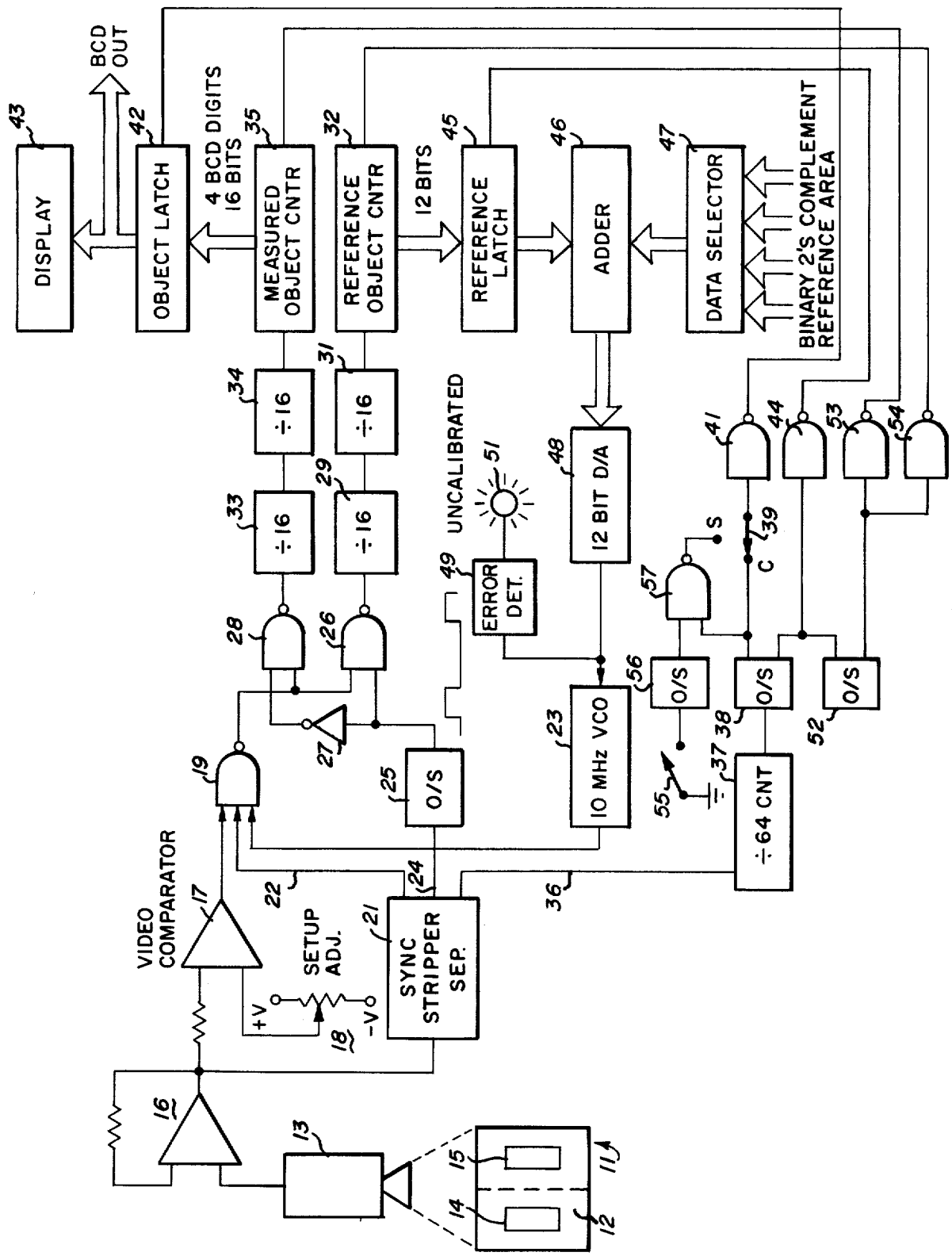

OPTICAL METHOD AND APPARATUS FOR THE AREA MEASUREMENT OF OPAQUE OBJECTS

BACKGROUND OF THE INVENTION

There are many applications wherein the measurement of the surface area of an opaque object is of considerable importance. For example, in the semiconductor field, the cost of gallium arsenide wafers is based upon the surface area and is very high, of the order of $30.00 a square inch. It is very important from the vendor's as well as the purchaser's standpoint that the surface area of such wafers be accurately determined because of the large volume of such wafers sold. There presently exists apparatus for measuring the area of such opaque objects but such apparatus does not respond with the accuracy necessary for establishing the close tolerances needed in the area measurement.

SUMMARY OF THE PRESENT INVENTION

The present invention employs a technique wherein the surface area of the opaque object is scanned by optical means to produce a video output signal with a time period directly proportional to the surface area of the object. The video output signal is utilized to control the flow of pulses from a known pulse rate source to a pulse counter during said time period, thus converting the time period video output signal to a pulse count. Since the video output signal is proportional to the surface area of the opaque object, and since the pulse count is proportional to the time period of the video output signal, the pulse count is proportional to the surface area of the opaque object. This pulse count is then displayed in numerical units of area in square inches.

A standard reference opaque object with known surface area is also employed, and when scanning the measured opaque object, the surface area of the reference object is also scanned by the optical means to produce a video output signal with a time period directly proportional to the known surface area of the reference object. The video output signal is utilized to control the flow of pulses from said pulse source to a second pulse counter during said time period, thus converting the time period video output signal from the reference object to a pulse count which is proportional to the surface area of the reference object.

To correct for any possible drifts in the frequency of the pulse source, the actual pulse count in the second pulse counter obtained from scanning the reference object is compared with a predetermined pulse count known to accurately represent the known surface area of the reference object with the pulse source set to the correct pulse rate. Where the two pulse counts differ, an error signal is developed to control the pulse source rate and correct it such that the pulse count in the second pulse counter is substantially equal to the predetermined pulse count.

By maintaining the pulse rate of the pulse source accurate, the pulse count representing the surface area of the opaque object under measurement and registered in the first pulse counter will accurately reflect the true surface area of the object under measurement.

DESCRIPTION OF THE PREFERRED EMBODIMENTS

Referring now to FIG. 1, the present system comprises a light box 11 having a transparent upper surface 12 through which light is emitted as background illumination for a vidicon type TV camera optical scanner or sensor 13. The electron beam of the vidicon camera is scanned back and forth horizontally from left to right and also vertically in well known TV 2:1 interlaced scanning manner to convert light information to electrical or video information output. In this system, one frame is scanned every 1/30 second; each television frame is broken into two fields with the fields scanned alternately, each such field scan being produced in 1/60 of a second. A typical frame includes, for example, 525 horizontal scan lines.

The camera 13 scans the top surface 12 of the light box and where it is passing over the lighted area will produce one level output. When passing over an opaque area a second level output will be produced. An opaque reference object 14 with a known surface area is positioned on the top surface 12 of the light box in the one third area of the light box surface on the left hand side. The opaque object 15 under measurement with an unknown surface area is positioned on the light box upper surface 12 and in the two thirds area of the light box surface on the right hand side. As the upper surface of the light box is scanned from left to right, the camera first picks up light, then crosses over the opaque reference object 14, the beam moving from one edge thereof to the opposite edge. The lighted area between objects 14 and 15 is then scanned followed by the scan of the opaque object 15 being measured from one side to the other side. The lighted surface between the right hand edge of the object 15 being measured and the right hand side of the lighted box is then scanned. The camera beam is then returned to the left hand side of the light box for the next, slightly lower, horizontal scan.

The output of the TV camera 13 is transmitted to an amplifier stage 16 and then to a video comparator 17 which compares the output from the amplifier stage 16 with a reference input 18. The output of the video comparator 17 to one input of the measure NAND gate 19 is a high when the opaque objects are scanned and a low when the light is being scanned. The output of the amplifier stage 16 is also transmitted to a well known sync stripper circuit 21 that separates out the horizontal sync pulses, the vertical sync pulses, and the composite horizontal and vertical sync pulses.

When the retrace of the scan occurs, either horizontal retrace or vertical retrace, the composite output 22 goes low to the measure NAND gate 19 to disable the gate 19 during such retrace. When the TV tube is scanning the light box and opaque objects, the composite signal goes high to enable the measure gate 19.

The third input to the measure gate 19 is a square wave pulse output at, for example, 10MHz, from the voltage controlled oscillator circuit 23. Therefore, when the other two inputs from the video comparator 17 and sync composite 22 are high, the measure gate 19 will pass the pulses from the VCO pulse source.

The horizontal pulse output 24 from the sync stripper 21 at the beginning of each horizontal sweep operate the one shot circuit 25 which produces a high on its output for a time duration equal to the time needed to complete approximately one third of the horizontal sweep, the time during which the reference object 12 is being scanned. This enables the reference object counter NAND gate 26 and, at the same time via the inverter 27, disables the measured object counter NAND gate 28. After the one third sweep time, the output of the one shot 25 goes low, disabling the reference object counter gate 26 and enabling the measured object counter gate 28 which remains enabled during the time period of the last two thirds of the horizontal sweep.

Therefore, the pulses passing through the measure gate 19 during the sweep time of the opaque reference object 12, which time depends upon the width of the reference object along the particular horizontal scanning line, also pass through the reference object counter gate 26 and via a pair of divider circuits 29 and 31 to the reference object counter 32. These pulses are registered in the reference object counter 32 on each horizontal sweep, the pulses developed during each successive horizontal sweep being added together for each frame. The reference object counter 32 contains five stages of divide by sixteen binary counters. The last three counters in the reference counter chain provide 12 bits which correspond to the area of the reference standard.

Also, the pulses passing through the measure gate 19 during the sweep time of the opaque measured object 15, which time depends upon the width of the measured object 15 along the particular horizontal scanning line, also pass through the measured object counter gate 28 and via a pair of divider circuits 33 and 34 to the measured object counter 35. These pulses are accumulated for the successive horizontal sweeps. The measured object counter 35 comprises two stages of divide by sixteen binary counters and four stages of BCD decade counters.

The vertical sync output 36 is transmitted to a divide by 64 circuit 37 so as to give one pulse output therefrom at the end of each block of 32 frames of the video scanning. This pulse output operates a one shot circuit 38. With the control switch 39 in the "continuous mode" position as shown, the output of the one shot 38 activates gate 41 which in turn operates the measured object latch 42 or register circuit to store the pulse count accumulated in the object counter 35 during the plurality of horizontal sweeps over the 32 frame period of time. Actually, the outputs of the four decade counters are stored in four latches for digital display in the display unit 43.

Gate 44 is also activated to operate the reference object latch or register circuit 45 to store the twelve bits of information in the last three counters of the reference counter 32. This count should be an accurate measure of the known actual surface area of the opaque reference standard 14 provided the pulse rate of the VCO 23 did not change or drift with temperature and the like. These 12 bits stored in the latches 45 are routed to the inputs of a 12 bit parallel adder 46. The other inputs to the 12 bit adder 46 are a twelve bit word set up by the operator in the data selector 47 corresponding to the known area of the reference standard. This 12 bit word is in the 2's compliment binary form so when it is added to the reference counter output in the latch 45 a 12 bit error word is generated by the adder 46 which is the difference between the operator set reference standard and the actual measured reference standard.

The 12 bit error signal from the adder 46 is transmitted to a D to A convertor 48 which converts the error signal to an analog voltage which can be either positive or negative. This voltage error signal is transmitted to the voltage controlled oscillator 23 to change the output pulse rate so that the count on the reference counter 32 becomes equal to the set reference object area count. This correction of the pulse rate of the VCO 23 then results in an accurate pulse count for the area of the measured opaque object 15.

An error detector circuit 49 and associated "uncalibrated" light 51 is provided should the error signal be of a gross nature, as when the operator has her thumb over the reference area on the light box 11 or where the operator has set a reference area count for one square inch while using a two square inch reference standard 14.

The one shot 52 is triggered on the trailing edge of the output of the one shot 38 and acts via gates 53 and 54 to clear the measured object and reference object counter chains.

The above system operates continuously, giving a new readout on display 43 of the measured object 15 every 32 frames. Where only one readout is desired, the operator places the measure control switch 39 in the "single" position and operates the read switch 55 to activate the one shot 56. The output of one shot 56 has a time period somewhat greater than the time of 32 frames, e.g., 1¼ to 1½ the time period of 32 frames, so that the gate 57 will have one output pulse which activates gate 41 to operate the measured object latch circuit 42 only once during one of the 32 frame periods. No further outputs will occur from gate 57 until such time as the operator operates the read switch 55 for a subsequent single reading.

It should be noted that the objects positioned on the light box need not be opaque but may be translucent and the term opaque used herein is meant to cover all instances in which a change in the transmitted light is produced by the objects positioned on the surface of the light box.

What is claimed is:

1. The method for measuring the surface area of an opaque object comprising the steps of;

scanning the opaque measured object to produce a video signal output having a first time period directly proportional to the area of the object and scanning an opaque reference object with a known surface area to produce a video signal output having a second time period proportional to the area of said reference object, passing a flow of pulses from a pulse source with a controllable pulse rate to a first counter during said first time period, the pulses counted during said first time period being proportional to the area of said measured object and serving as a measure of said area, passing a flow of pulses from said pulse source to a second counter during said second time period, the pulses counted during said second time period being proportional to the area of said reference object, comparing the pulse count obtained from said reference object scan with an established predetermined pulse count directly proportional to the surface area of said reference object to obtain an error signal output where said actual pulse count from said reference object during said scan differs from said established pulse count, and controlling the rate of said pulses produced from said pulse source in response to said error signal to maintain said actual count from said reference object scan substantially equal to said established predetermined count.

2. The method as claimed in claim 1 wherein the step of scanning the measured and reference opaque objects comprises scanning with a television camera over a plurality of successive frames.

3. Apparatus for measuring the surface area of an opaque object comprising, means for scanning the measured opaque object to produce a video signal output having a first time period directly proportional to the area of the object and for scanning an opaque reference object with a known surface area to produce a video signal output having a second time period directly proportional to the area of said reference object, a pulse source with a controllable rate of pulses, a first pulse counter, means for passing a flow of pulses from said pulse source to said first counter during said first time period, the pulses counted by said counter during said first time period being proportional to the area of said measured object and serving as a measure of said area, a second pulse counter, means for passing a flow of pulses from said pulse source to said second counter during said second time period, the pulses counted during said second period being proportional to the area of said reference object, a source of a predetermined pulse count which is directly proportional to the known surface area of said reference object, means for comparing the pulse count in said second counter obtained from said reference object scan with said predetermined pulse count to obtain an error signal output where said actual pulse count from said reference object during said scan differs from said predetermined pulse count, and means for controlling the rate of said pulses produced from said pulse source in response to said error signal to maintain said actual pulse count from said reference object scan substantially equal to said predetermined pulse count.

4. Apparatus for measuring the surface area of an opaque object comprising, means comprising a television camera for scanning the opaque measured object to produce a video signal output having a first time period directly proportional to the area of the measured object and for scanning an opaque reference object with a known surface area to produce a video signal output having a second time period directly proportional to the area of said reference object, a pulse source comprising a voltage controlled oscillator, a first pulse counter, means including a gate responsive to said video signal for passing a flow of pulses from said pulse source to said first counter during said first time period, the pulses counted by said counter during said first time period being proportional to the area of said measured object and serving as a measure of said area, a second pulse counter, means for passing a flow of pulses from said pulse source to said second counter during said second time period, the pulses counted during said second time period being proportional to the area of said reference object, a source of a predetermined pulse count which is directly proportional to the known surface area of said reference object, means for comparing the pulse count in said second counter obtained from said reference object scan with said determined pulse count to obtain a voltage error signal output where said actual pulse count from said reference object during said scan differs from said predetermined pulse count, and means for controlling the rate of said pulses produced from said voltage controlled oscillator in response to said voltage error signal to maintain said actual pulse count from said reference object scan substantially equal to said predetermined pulse count.

* * * * *